United States Patent [19]

Bühler et al.

[11] Patent Number: 4,472,307
[45] Date of Patent: Sep. 18, 1984

[54] PREPARATION OF ANILINO AZO CARBAZOLE DYESTUFFS PREPARED BY DIAZOTIZATION BY NITROSYLSULPHURIC ACID IN ACETIC ACID

[75] Inventors: Ulrich Bühler, Schöneck; Wolfgang Bodenstedt, Frankfurt am Main; Heinz Hänel, Offenbach; Eberhardt Hebestreit, Frankfurt am Main; Horst Tappe, Dietzenbach, all of Fed. Rep. of Germany

[73] Assignee: Cassella Aktiengesellschaft, Frankfurt am Main, Fed. Rep. of Germany

[21] Appl. No.: 410,138

[22] Filed: Aug. 20, 1982

[30] Foreign Application Priority Data

Oct. 14, 1981 [DE] Fed. Rep. of Germany ....... 3140716

[51] Int. Cl.³ .................. C09B 29/01; C09B 29/40; C09B 41/00
[52] U.S. Cl. .................................. 260/164; 260/141; 260/208
[58] Field of Search .................. 260/164, 141 P

[56] References Cited

FOREIGN PATENT DOCUMENTS 2212755 9/1973 Fed. Rep. of Germany ...... 260/164
2338089 2/1975 Fed. Rep. of Germany ...... 260/164

OTHER PUBLICATIONS

Gilman et al., J. Org. Chem., vol. 22, pp. 562 to 564 (1957).

*Primary Examiner*—Floyd D. Higel
*Attorney, Agent, or Firm*—Connolly and Hutz

[57] ABSTRACT

An improved process for the preparation of azo dyestuffs of the formula

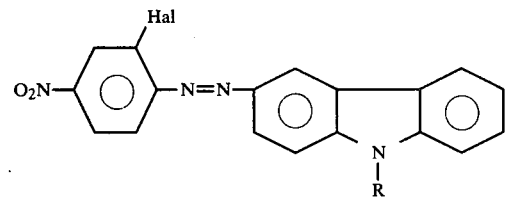

comprising diazotizing a 2-halo-4-nitroaniline at 10° to 35° C. in 70 to 100 percent by weight strength acetic acid by means of nitrosylsulphuric acid, adjusting the acetic acid content of the resulting diazo solution to 60 to 85% by the addition of water, and at a temperature from 15° to 45° C. adding an appropriate carbazole to the diazo solution as a solid or in the form of a suspension in 60 to 100 percent strength by weight acetic acid and coupling the carbazole to the diazotized amine to produce said azo dyestuff and isolating the dyestuff.

10 Claims, No Drawings

PREPARATION OF ANILINO AZO CARBAZOLE DYESTUFFS PREPARED BY DIAZOTIZATION BY NITROSYLSULPHURIC ACID IN ACETIC ACID

The present invention relates to a process for preparing azo dyestuffs of the formula I

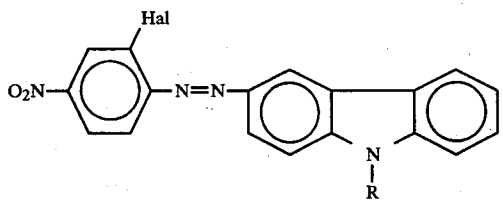

in which Hal denotes bromine or chlorine and R denotes alkyl which has 1 to 4C atoms and is optionally substituted by hydroxyl, cyano, alkoxy having 1 to 4C atoms, alkoxycarbonyl having 1 to 4C atoms in the alkoxy radical or alkoxyalkoxycarbonyl having 1 to 4C atoms in each of the two alkoxy radicals or hydrogen, by diazotising an amine of the formula II

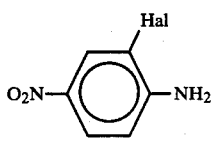

and coupling the diazotised amine onto a carbazole of the formula III

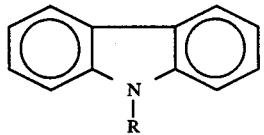

and isolating the dyestuff after the coupling is complete.

Azo dyestuffs are usually prepared by diazotisation and coupling in an aqueous medium. In this method, dyestuffs of the formula I can be prepared only in poor yields and purities, since the solubility conditions, in particular of the coupling component, are unfavourable. However, other diazotisation and coupling methods for preparing dyestuffs of the formula I also produce these dyestuffs only in moderate yields. The low yields are usually associated with the presence of impurities, which makes it necessary that the dyestuffs thus obtained have to be recrystallised before use. In some methods, various organic solvents, the regeneration of which is extremely difficult, are used for dissolving the coupling component and for washing the dyestuff.

Thus, according to German Offenlegungsschrift No. 2,212,755, the diazo component is diazotised in glacial acetic acid and the diazotised product is coupled onto carbazole, which is dissolved in dimethylformamide, and the isolated dyestuff is washed with methanol and water. In this process, a water-containing mixture of three organic solvents thus has to be regenerated.

According to the teaching of German Offenlegungsschrift No. 2,603,836, carbazole is suspended, for the coupling, in butanol. In this case the dyestuff yield is about 82%. However, up to 18% of 3-chloronitrobenzene is additionally produced, and this by-product can either not be separated from the dyestuff in working up or it becomes concentrated in the butanol and leads to problems in working up.

Furthermore, Collect. Czechoslov. Chem. Comm. 25, 1324 (1960) and 29, 2264 (1964) describe synthesis methods in which carbazole is coupled in dioxane or in ethanol. In one case the yields are 55%, while in the other case they are low.

J. Org. Chem. 22, 562 (1957) describes a process in which 4-nitroaniline is coupled with a 1.4% yield onto N-ethylcarbazole in glacial acetic acid.

The process of Swiss Patent Specification No. 367,254 relates to a process in which monoazo dyestuffs sparingly soluble in water are prepared and in which, according to Example 1, the coupling component is dissolved in glacial acetic acid. If this process is used for preparing the dyestuff of the formula I in which Hal denotes chlorine and R denotes ethyl, a yield of 80% is obtained. This dyestuff, dyed on polyester, produces a dyeing which is about 50% weaker than the dyestuff prepared by the process according to the invention.

According to Example 1 of U.S. Pat. No. 3,787,178, the diazo component is added to a mixture of nitrosylsulphuric acid, glacial acetic acid and propionic acid. A solution of butylcarbazole in glacial acetic acid is then added. If this process is used to prepare the dyestuff of the formula I in which Hal is chlorine and R is hydrogen, a darkish powder is obtained which contains only about 46% by weight of the desired dyestuff.

It has now been found, surprisingly, that it is possible to avoid the disadvantages of existing preparation methods and to prepare the dyestuffs of the formula I in yields of up to more than 99%. The process according to the invention for preparing the dyestuffs of the formula I is characterised in that the amine of the formula II is diazotised at 10° to 35° C. in 70 to 100 percent by weight strength acetic acid by means of nitrosylsulphuric acid, the acetic acid content of the diazo solution is reduced down to 60 to 85% by the addition of water and, at 15° to 45° C., a carbazole of the formula III is added as a solid or in the form of a suspension in 60 to 100 percent strength by weight acetic acid. Possible amines of the formula II are 2-chloro-4-nitroaniline and 2-bromo-4-nitroaniline.

The alkyl radical represented by R and the alkoxy, alkoxycarbonyl or alkoxyalkoxycarbonyl radicals which are possible substituents for R can be straight-chain or branched. Examples of carbazoles of the formula III are carbazole and also carbazoles which are substituted on the nitrogen by the following radicals: methyl, ethyl, n-propyl, i-propyl, n-butyl, i-butyl, sec.-butyl, 2-hydroxyethyl, 4-hydroxyethyl, 2-methoxyethyl, 2-ethoxyethyl, 2-n-propoxyethyl, 2-i-propoxyethyl, 2-n-butoxyethyl, 2-i-butoxyethyl, 3-methoxybutyl, 4-methoxybutyl, 2-cyanoethyl, 2-methoxycarbonylethyl or 2-ethoxycarbonylethyl. Preferred radicals for R are hydrogen, alkyl having 1 to 4C atoms or cyanoethyl, in particular when these radicals are present in the dyestuffs of the formula I together with Hal=chlorine. The process according to the invention is very particularly suitable for preparing the dyestuff of the formula I in which Hal denotes chlorine and R denotes hydrogen.

The amine of the formula II is diazotised in 70 to 100 percent strength by weight, preferably in 85 to 95 percent strength by weight and very particularly preferably in 88 to 92 percent strength by weight, acetic acid at temperatures of 10° to 35° C., preferably 10° to 30° C., by means of nitrosylsulphuric acid, advantageously while stirring. It is advantageous if the amine of the formula II is present in the acetic acid in dissolved or finely divided form before or during the diazotisation. The desirable state of fine division is obtained, for example, by dissolving, as completely as possible, the amine of the formula II in the acetic acid before the addition of nitrosylsulphuric acid, while stirring at temperatures of 15° to 50° C., preferably 20° to 40° C., and then cooling the solution down to the diazotisation temperature, whereby amine which separates out precipitates in finely divided form.

The diazotisation of the amine of the formula II by means of nitrosylsulphuric acid should be carried out rapidly, that is to say within 5 to 45, preferably within 5 to 20, minutes, since otherwise a triazine of the formula IV

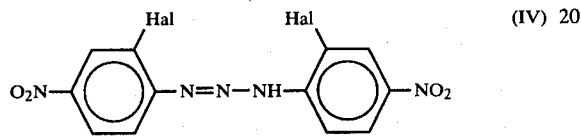

would form, which is very sparingly soluble in the acetic acid used and would thus precipitate. This could lead to local superheating and hence to decomposition of diazonium compounds still present, to stirrer standstill and to discontinuation of the reaction desired. Rapid addition of nitrosylsulphuric acid rapidly acidifies the medium to such an extent that only a small amount of free amine of the formula II is still present and triazine formation is largely suppressed. The small amounts of triazine of the formula IV formed are back-split at the temperatures used in the process according to the invention, and the resulting amine of the formula II liberated is quantitatively diazotised. Since the addition of nitrosylsulphuric acid is exothermic, whereas the diazo solution must not be over heated, the time taken for adding the nitrosylsulphuric acid depends primarily on the intensity of cooling during the diazotisation.

Advantageously, the diazotisation is started slightly above the temperature at which the solution or suspension of the amine of the formula II solidifies, and it is then possible to maintain the temperature below 25° to 35° C. by cooling with ice. After the addition of nitrosylsulphuric acid, the mixture is continued to be stirred for some time, to complete the diazotisation, and the acetic acid content of the diazo solution is then reduced to 60 to 85% by weight, preferably to 68 to 73% by weight, by the addition of water. The addition of water must not lower the acetic acid content of the diazo solution to below 60% by weight, since, in this case, the coupling component would not longer be sufficiently well soluble and the stability of the diazonium compound would decrease.

To avoid nitrosation reactions on the coupling component of the formula III, it is advantageous to reduce or eliminate the excess of diazotising agent in the diazo solution by means of a nitrite-destroying agent, such as urea or amidosulphonic acid. Such agents can be added to the diazo solution before or after the dilution with water.

The coupling is carried out at temperatures of 15° to 45° C., preferably 20° to 35° C., by gradually adding the carbazole of the formula III to the diazo solution, for example in the course of a ½ to 2 hours, advantageously while stirring. This carbazole of the formula III should advantageously be present in a finely divided form. When a carbazole of the formula III is added in solid form, the state of fine division can have been brought about, for example, by preceding milling of the carbazole. When a carbazole of the formula III is added in the form of a suspension in acetic acid, it is advantageous first to dissolve the carbazole of the formula III as completely as possible by means of heating in the five- to fifty-fold amount of 60 to 100 percent strength by weight acetic acid and thereafter to cool the solution down to a temperature which is not above the coupling temperature, and the result is that the carbazole of the formula III separating out precipitates in finely divided form. The acetic acid of the suspension must not lower the acetic acid content of the coupling batch to below 60% by weight or increase it to above 85% by weight.

The time taken for adding the carbazole of the formula III depends on the size of the batch and, in the case of kg scale batches, it is advantageously prolonged to 1 to 2 hours.

The coupling temperature must not be less than 15° C., since, in this case, the carbazole derivative added would become too sparingly soluble and long coupling times would be necessary or content and yield of pure dyestuff would decrease, since the precipitating dyestuff includes coupling component or the diazonium compound decomposes at when the reaction time is too long. Advantageously, the coupling reaction is carried out at 20° to 30° C. and completed at temperatures of up to 40° C.

During the coupling, the dyestuff formed precipitates, so that almost the entire amount of acetic acid used is available as solvent for the diazonium compound and the coupling component.

The process according to the invention produces the dyestuffs of the formula I in yields of up to 99% and higher, in excellent purities. The relatively high purities, on coloristic application, result in relatively high depths and usually also in better values for dry heat pleating fastness and dry heat fixation fastness compared to dyestuffs prepared by other processes. The acetic acid solution obtained in the process according to the invention can be regenerated.

EXAMPLE 172.6 g (1 mol) of 2-chloro-4-nitroaniline are dissolved with stirring at 20° to 40° C. in 2,506.0 g of 90 percent strength by weight acetic acid, in a 6 l glass flask. The solution is then cooled down to 10° to 15° C. 326.0 g of nitrosylsulphuric acid are then allowed to flow into the solution in the course of 10 to 15 minutes while cooling. This increases the temperature in the flask to 20° to 30° C., depending on the intensity of cooling. To complete the diazotisation, the batch is stirred for a further 30 minutes within this temperature range. The diazo solution is then diluted with 680.0 g of water and then heated to 30° to 35° C. 175.5 g of carbazole are then added at 30° to 35° C. in the course of 30 minutes, and the resulting mixture is then stirred for 2 hours at this temperature. To complete the coupling, the mixture is further stirred at 35° to 40° C. After 2 to 3 hours, the coupling is complete. The batch is then cooled down to 10° to 15° C., and the dyestuff is filtered off with suction and washed with water until neutral. The original filtrate and the first part of the water wash filtrate are regenerated by rectification. Dyestuff yield:

345.5 g dry, purity 99.6%, which corresponds to 98.6% of theory; melting point: 218° to 224° C.

The dyestuffs listed in the table which follows can be prepared by the process according to the invention:

TABLE

Dyestuffs of the formula

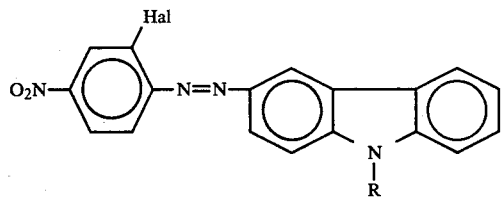 (I)

| No. | Hal | R |
|---|---|---|
| 1 | Br | H |
| 2 | Cl | CH₃ |
| 3 | Cl | C₂H₅ |
| 4 | Br | C₂H₅ |
| 5 | Cl | n-C₃H₇ |
| 6 | Cl | n-C₄H₉ |
| 7 | Br | i-C₃H₇ |
| 8 | Cl | i-C₄H₉ |
| 9 | Br | sek.-C₄H₉ |
| 10 | Cl | (CH₂)₂OH |
| 11 | Cl | (CH₂)₂OCH₃ |
| 12 | Cl | (CH₂)₂OC₂H₅ |
| 13 | Br | (CH₂)₂-O-nC₄H₉ |
| 14 | Br | (CH₂)₄-OCH₃ |
| 15 | Cl | (CH₂)₂CN |
| 16 | Br | (CH₂)₂CN |
| 17 | Cl | (CH₂)₂COOCH₃ |
| 18 | Br | (CH₂)₂COOC₂H₅ |
| 19 | Cl | (CH₂)₂COO—n-C₃H₇ |
| 20 | Cl | (CH₂)₂COO—n-C₄H₉ |
| 21 | Br | (CH₂)₂COO—i-C₄H₉ |
| 22 | Cl | (CH₂)₂COO(CH₂)₂OCH₃ |

What is claimed is:

1. In the process for preparation of azo dyestuffs of the formula

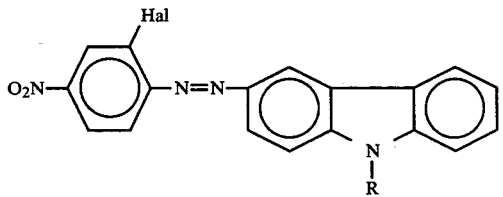

wherein Hal is bromo or chloro and R is hydrogen or alkyl having 1 to 4 carbon atoms unsubstituted or substituted by hydroxyl, cyano, alkoxy having 1 to 4 carbon atoms, alkoxycarbonyl having 1 to 4 carbon atoms in the alkoxy moiety or alkoxyalkoxycarbonyl having 1 to 4 carbon atoms in each of the two alkoxy moieties, comprising diazotizing an amine of the formula

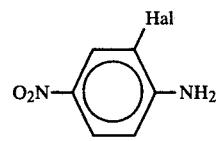

in acetic acid with nitrosylsulphuric acid, coupling the diazotized amine with a carbazole of the formula

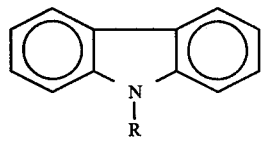

and isolating the dyestuff after coupling is complete, wherein the improvement comprises diazotizing said amine at 10° to 35° C. in 70 to 100 percent by weight strength acetic acid by means of nitrosylsulphuric acid, adjusting the acetic acid content of the diazo solution to 60 to 85% by the addition of water, and at a temperature from 15° to 45° C. adding said carbazole to the diazo solution as a solid or in the form of a suspension in 60 to 100 percent strength by weight acetic acid.

2. The process according to claim 1 for preparation of said azo dyestuffs wherein R is hydrogen, alkyl having 1 to 4 carbon atoms or cyanoethyl.

3. The process according to claim 1 or claim 2 for preparation of said azo dyestuffs wherein Hal is chloro and R is hydrogen.

4. The process according to claim 1 wherein the amine is diazotized in 85 to 95 percent strength by weight acetic acid.

5. The process according to claim 1 wherein the amine is diazotized for 5 to 45 minutes.

6. The process according to claim 1 wherein after diazotization the acetic acid content of the diazo solution is adjusted to 68 to 73% by weight by the addition of water.

7. The process according to claim 1 wherein said carbazole is added to the diazo solution at 20° to 35° C.

8. The process according to claim 1 wherein said carbazole is added to the diazo solution in finely divided solid form.

9. The process according to claim 1 wherein prior to diazotization the amine is in finely divided form.

10. The process according to claim 1 wherein said carbazole is added to the diazo solution over a period of from 0.5 to 2 hours.

* * * * *